(12) United States Patent
Shamis et al.

(10) Patent No.: US 9,438,527 B2
(45) Date of Patent: Sep. 6, 2016

(54) FLEXIBLE QUEUES IN A NETWORK SWITCH

(71) Applicant: MARVELL WORLD TRADE LTD., St. Michael (BB)

(72) Inventors: Michael Shamis, Netanya (IL); Youval Nachum, Holon (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 162 days.

(21) Appl. No.: 13/901,345

(22) Filed: May 23, 2013

(65) Prior Publication Data

US 2013/0315054 A1  Nov. 28, 2013

Related U.S. Application Data

(60) Provisional application No. 61/651,227, filed on May 24, 2012, provisional application No. 61/825,182, filed on May 20, 2013.

(51) Int. Cl.
*H04L 12/869* (2013.01)
*H04L 12/933* (2013.01)
*H04L 12/935* (2013.01)

(52) U.S. Cl.
CPC ............ *H04L 47/58* (2013.01); *H04L 49/103* (2013.01); *H04L 49/3036* (2013.01)

(58) Field of Classification Search
CPC .. H04L 47/58; H04L 49/103; H04L 49/3036
USPC ........................................ 370/225, 237, 401
See application file for complete search history.

(56) References Cited

U.S. PATENT DOCUMENTS

| 6,351,474 | B1 * | 2/2002 | Robinett .......... H04N 21/23424 370/468 |
| 7,697,422 | B1 | 4/2010 | Arad et al. |
| 2003/0058880 | A1 * | 3/2003 | Sarkinen et al. .............. 370/413 |
| 2004/0163084 | A1 * | 8/2004 | Devadas et al. ............... 718/103 |
| 2005/0207436 | A1 * | 9/2005 | Varma ............................ 370/412 |
| 2007/0180188 | A1 * | 8/2007 | Fujibayashi et al. .......... 711/112 |
| 2008/0259798 | A1 * | 10/2008 | Loh et al. ...................... 370/235 |
| 2010/0014428 | A1 * | 1/2010 | Naven ................. H04L 49/3018 370/237 |
| 2011/0182181 | A1 * | 7/2011 | Kang et al. .................... 370/231 |
| 2012/0063316 | A1 * | 3/2012 | Ghanwani ............... H04L 47/10 370/235 |
| 2012/0063333 | A1 * | 3/2012 | Gnanasekaran et al. ..... 370/252 |

(Continued)

OTHER PUBLICATIONS

IEEE P802.1Qau/D2.4 "Virtual Bridged Local Area Networks—Amendment: Congesting Notification" Draft Standard for Local and Metropolitan Area Networks, *The Institute of Electrical and Electronics Engineers, Inc.*, Oct. 2009.

(Continued)

*Primary Examiner* — Brian D Nguyen

(57) ABSTRACT

In an apparatus for receiving and forwarding data packets on a network, a network device includes a plurality of ports for coupling to the network and for transmitting packets to devices disposed in or coupled to the network. At least one processor configured to process packets received via the network processes packets by selectively forwarding processed packets to one or more of the ports. A plurality of queues are defined in a memory, each configured to store packets to be transmitted by ports in the plurality of ports. A queue manager is configured to selectively assign a subset of the plurality of queues to a subset of the plurality of ports.

25 Claims, 8 Drawing Sheets

(56) References Cited

U.S. PATENT DOCUMENTS

2013/0148654 A1* 6/2013 Sayani et al. ............... 370/389
2013/0308648 A1 11/2013 Shamis et al.

OTHER PUBLICATIONS

IEEE P802.1Qaz/D2.5 "Virtual Bridged Local Area Networks—Amendment XX: Enhanced Transmission Selection for Bandwidth Sharing Between Traffic Classes," Draft Standard for Local and Metropolitan Area Networks—*The Institute of Electrical and Electronics Engineers, Inc.*, Mar. 2011.

IEEE P802.1Qbb/D2.3 "Virtual Bridged Local Area Networks—Amendment: Priority-based Flow Control," Draft Standard for Local and Metropolitan Area Networks, *The Institute of Electrical and Electronics Engineers, Inc.*, May 2010.

IEEE P802.1Q-REV/D1.5 "Media Access Control (MAC) Bridges and Virtual Bridged Local Area Networks," Draft Standard for Local and Metropolitan Area Networks—*The Institute of Electrical and Electronics Engineers, Inc.*, Mar. 2011.

U.S. Appl. No. 13/847,316, Sukonik, et al., "Dummy Queues and Virtual Queues in a Network Device," filed Mar. 19, 2013.

\* cited by examiner

FLEXIBLE QUEUES IN A NETWORK SWITCH

CROSS-REFERENCES TO RELATED APPLICATIONS

The present application claims the benefit of U.S. Provisional Application No. 61/651,227, entitled "Flexible Queues," filed on May 24, 2012, and U.S. Provisional Application No. 61/825,182, also entitled "Flexible Queues," filed May 20, 2013, the entire disclosures of which are hereby incorporated by reference herein in their entireties and for all purposes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices such as network switches, routers, edge devices, and the like often employ store and forward architectures in which received packets are queued in memory in the network device—for example, but not only, for scheduling—for subsequent transmission from the network device. Such network devices typically perform traffic "shaping" by storing packets corresponding to different subscribers, or to packets having different priorities, in separate queues, and independently controlling transmission of packets stored in each of the queues. With growing numbers of subscribers and growing numbers of services offered to subscribers, such network devices need to support, for example, flexible provision and assignment of queues to switch ports.

SUMMARY

In one embodiment, a network device includes a plurality of ports for coupling to a network and for transmitting packets to devices disposed in or coupled to the network. The network device also includes at least one processor configured to process packets received via the network, which processing includes selectively forwarding processed packets to one or more of the ports. The network device further includes a plurality of queues defined in a memory. The plurality of queues is configured to store packets to be transmitted by ports in the plurality of ports. A queue manager in the network device is configured to selectively assign a subset of the plurality of queues to a subset of the plurality of ports.

In another embodiment, a network device includes a plurality of ports configured to (i) couple the network device to a network and (ii) transmit packets to devices disposed in or coupled to the network. The device also includes a plurality of port profiles. Each port profile corresponds to one of the plurality of ports and indicates a feature of packet traffic destined for the port or a feature of a device coupled to the port. Further, the network device includes at least one processor configured to process packets received from the network. The processing includes selectively forwarding processed packets to one or more of the ports. A plurality of queues is defined in a memory of the network device. The plurality of queues is configured to store packets to be transmitted by ports in the plurality of ports. The network device also includes a queue manager responsive to the port profiles and arranged to configurably assign to each of the plurality of ports one or more of the plurality of queues according to the port profile corresponding to the port.

In still another embodiment, a network device includes a plurality of ports configured to (i) couple to a network, (ii) receive packets via the network, and (iii) transmit packets via the network. The network device includes at least one processor configured to process packets received via the network. The processing includes selectively forwarding received packets to one or more of the ports for transmission via the network. A plurality of queues is defined in a memory of the network device. The plurality of queues is configured to store packets to be transmitted via the network. The network device further includes a queue manager configured to (i) intercept a congestion notification sent to an upstream device in or coupled to the network from a downstream device in or coupled to the network and, (ii) mitigate congestion according to the intercepted congestion notification by (a) allocating one or more additional queues to a port or (b) modifying a queue length of a queue.

In yet another embodiment, a method of configuring a network device includes configuring a plurality of ports to transmit network packets to devices disposed in or coupled to a network to which the ports are or will be connected, and configuring at least one processor to process packets received via the network, the processing including selectively forwarding processed packets to one or more of the ports. The method also includes defining in a memory a plurality of queues, configuring the plurality of queues to store packets to be transmitted, and configuring a queue manager to selectively assign a subset of the plurality of queues to a subset of the plurality of ports.

In another embodiment, a method of operating a network device includes receiving packets at ports of the network switch and determining, in a forwarding engine, one or more ports to which each of the received packets should be forwarded. The method also includes queuing each packet in a queue according, at least in part, to the corresponding determination of the one or more ports to which the packet should be forwarded. Further, the method includes selecting from a pool of available queues a subset of queues to associate with a port, and associating the selected subset of queues with the port.

In still another embodiment, a method of operating a network device having a plurality of ports coupled to a network includes processing packets received from the network to selectively forward the received packets to one or more of the ports for transmission and storing the received packets in a plurality of queues, the queues defined in a memory and configured to store packets to be transmitted via the network. The method includes intercepting a congestion notification sent to an upstream device disposed in or coupled to the network from a downstream device disposed in or coupled to the network, and performing in a queue manager, according to the intercepted congestion notification, a queue modification action including (a) allocating one or more additional queues to a port or (b) modifying a queue length of a queue.

DETAILED DESCRIPTION

Figure 1:
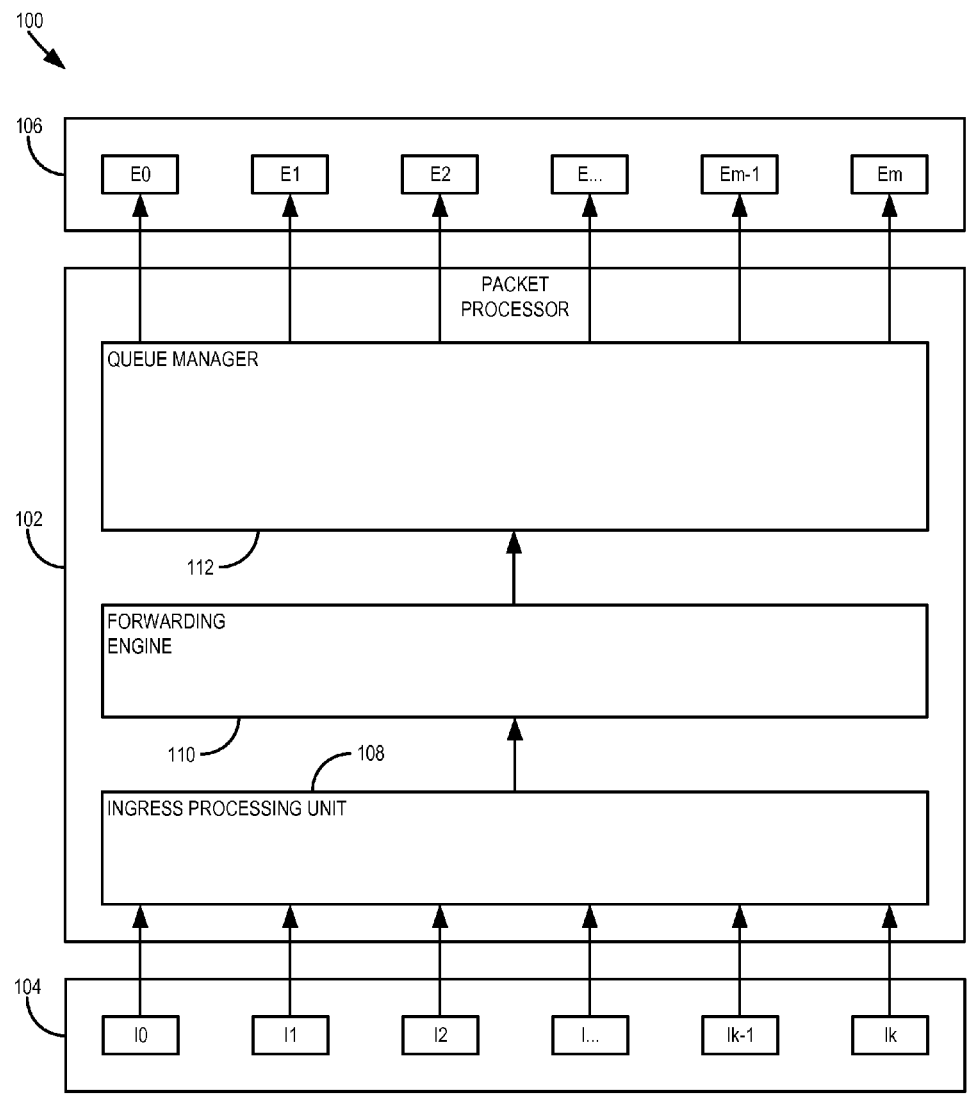
FIG. 1 is a block diagram of an embodiment of a network switch configured to efficiently manage traffic traversing the network device by implementing a queue manager.

In embodiments described below, a network switch receives packets from an upstream device and forwards the packets to a downstream device. The packets are forwarded according to the type of information included in the packet and/or according to the protocol embodied by the packet. Packets are queued for transmission to downstream devices according to the type of packet and/or protocol, and/or according to the priority of the packet, such that packets related to real-time or near-real time communications are transmitted before packets that are not related to data that is highly time-sensitive. The packets are queued and/or prioritized so as to limit network congestion on particular ports, downstream devices, networks, and the like, in embodiments. The network switch includes a queue manager that, among other things, configurably assigns and/or couples available queues to ports of the network switch.

The methods and apparatus described herein facilitate the increasing and/or decreasing of the number of queues associated with and coupled to each port (or port group) of a network switch. The additional flexibility, in turn, facilitates implementation of extended priority schemes such as that described in U.S. patent application Ser. No. 13/894,952 entitled "Extended Priority for Ethernet Packets", as well as the Differentiated Services Code Point (DSCP) architecture and other queuing strategies. For example, where prior network switches generally support a maximum of eight queues per port, the presently described methods and apparatus can provide more than eight queues per port. In embodiments, for example, a network switch can be configured via the queue manager to assign 64 (or any other number of available queues) queues per port. In such embodiments, each of 64 quality of service (QoS) profiles on a network can be mapped directly to a particular queue for each port. As another example, the implementation of the queue manager described herein allows the network switch to support (or better support) a multi-tenant environment having, for example, eight tenant profiles each having eight queues.

In embodiments, the queue manager configurably couples available queues to a number of ports upon initial configuration of the device according to, for example, the number of available queues and the number of ports activated in the switch and, thereafter, the queues assigned to each of the ports remain fixed for the lifetime of the device. In other embodiments, the queue manager configurably assigns and/or couples available queues to ports of the network switch according to one or more conditions during the operation of the network switch and, for example, assigns and couples available queues to ports of the network switch according to traffic network traffic congestion conditions. In still other embodiments, the queue manager configurably assigns and couples available queues to ports of the network switch according to a configuration routine that facilitates configuration of the network switch, for example, by a network administrator configuring the network switch to assign available queues to ports according to a traffic type associated with each port, for example. Details of these and other embodiments will be described below.

FIG. 1 is a block diagram of an embodiment of a network switch 100 configured to efficiently manage traffic traversing the network device by implementing a queue manager. Though referred to herein as a network switch, the network switch 100 is, in various embodiments, a switch, a router, or other network device configured for forwarding, switching, or routing packets. The network switch 100 typically is connected to a network and processes packets for forwarding, switching, or routing to other network devices. The network switch 100 is configured to support a plurality of subscribers and to manage traffic egressing the network switch 100, such that the overall bandwidth is efficiently shared by the plurality of subscribers, while efficiently utilizing resources of the network device 100, according to an embodiment. To these ends, the network switch 100 is configured to maintain a plurality of subscriber egress queues for packet flows (also referred to herein as "traffic flows") that are shaped (e.g., intentionally slowed or delayed) at egress from the network switch 100 (e.g., video on demand traffic, voice over internet protocol (VoIP) traffic, control traffic, gaming traffic, etc.), in various embodiments.

The network switch 100 includes a packet processor 102 coupled to a plurality of ports such as ingress ports 104 (also referred to herein as receive (RX) ports) and egress ports 106 (also referred to herein as transmit (TX) ports). In general, the packet processor 102 is configured to process packets received via ingress ports 104, to determine respective egress ports 106 via which the packets should be transmitted, and to transmit the packets via the determined egress ports 106. In at least some embodiments, the packet processor 102 is configured to receive a packet at an ingress port 104, to store the packet in a memory, to perform processing of the packet while the packet is stored in the memory, to determine one or more egress ports 106 via which the packet should be transmitted, and, after making the forwarding decision, to retrieve the packet from the memory and transmit the packet via the one or more egress ports 106. The packet processor 102 includes an ingress processing unit 108 that generally performs initial processing of packets that ingress via the ports 104. In embodiments, the ingress processing unit 108 generates a packet descriptor for the packet, and the packet descriptor, rather than the packet itself, is subsequently processed by the packet processor 102. A packet descriptor includes some information from the packet, such as some or all of the header information of the packet, in an embodiment. In some embodiments, the packet descriptor additionally includes other information such as an indicator of where in the memory the packet is stored. For ease of explanation, the term "packet" hereinafter is used to refer to a packet itself or to a packet descriptor associated with the packet.

The ingress processing unit 108 (and an egress processing unit (not shown) each include one or more processing units (not seen in FIG. 1) configured to process a packet received by the network switch 100, in an embodiment. In various embodiments, the processing units within the ingress processing unit 108 include one or more of a tunnel termination interface (TTI) classification unit, an ingress policy unit, a bridge engine, an ingress policer unit, etc., and processing units within the egress processing unit include one or more of an egress filtering unit, a Layer 2 (and/or Layer 3) replication unit, a traffic shaping unit, a scheduling unit, an egress policy unit, an egress policer unit, etc. In one embodiment, the processing units of the ingress processing unit 108 are processing engines that are arranged in a series configuration within an ingress pipeline, and the processing units of the egress processing unit are processing engines that are arranged in a series configuration within an egress pipeline (not shown). Alternatively, the respective processing units correspond to portions of code executed in a pipeline of programmable processing units, such as a dataflow pipeline, defining a network (or packet processor), or are functional program modules of one or more software driven packet and/or network processors. Accordingly, it is noted that the principles described herein are equally applicable to suitable switch processor architectures other than those described, and the switch architecture is not to be construed as being limited to any particular architectural design.

The ingress processing unit 108 includes a packet classifier (not shown), in embodiments, that classifies each received packet based on one or more parameters associated with or determined for the packet, and assigns to the packet a particular traffic class and/or a particular data flow. Different data flows or different traffic classes are associated with different types of packets, for example, in an embodiment. For example, different data flows are defined for different subscribers and/or for different services (e.g., different applications) utilized by the subscribers, in some embodiments. The network switch 100 then independently manages the data flows, for example to ensure that services (e.g., real time services, bandwidth provisioned services, QoS services, etc.) provided to subscribers conform to service level agreements (SLAs) between service providers and their customers and to generally efficiently utilize the overall bandwidth of the network device 100, in an embodiment. For example, in an embodiment, the network switch 100 assigns different data flows different priority levels based on, for example the services to which the data flows correspond, and independently manages the data flows to transmit higher priority traffic with less delay than lower priority traffic.

In some embodiments, priority information is used to implement quality of service (QoS) during egress processing (e.g., egress traffic management) in the network switch 100. In an embodiment, a different priority is assigned to a packet or to a flow of which the packet is a part to differentiate between applications, delay sensitivity, and/or QoS offerings, for example. For instance, in an embodiment, a network operator guarantees to provide a customer with a specified amount of bandwidth for the customer's applications and further agrees to supply a certain quality of service based upon the type of traffic. To support differentiated services, the packet processor 102 maintains one or more attributes such as a priority, a traffic class, etc. for each data packet. These values are set when the packet is received and are sometimes altered as the packet passes through the various processing stages, in an embodiment. In some embodiments, traffic class, priority, and/or various other packet attributes are included as part of a QoS profile that is assigned to the packet by various hardware or software modules (not shown) of ingress processing unit 108. The packet processor 102 maintains attributes for each packet received at an ingress (RX) port 104 (e.g., I0, I1, I2, . . . , Ik) and uses this information for managing egress of traffic from the network switch 100 during egress processing of the packet, such as to schedule transmission of the packet at an egress (TX) port 106 (e.g., E0, E1, E2, . . . , Em). Although FIG. 1 depicts six ingress ports 104 and six egress ports 106, the network switch 100 includes different numbers of ingress ports 104 (e.g., 1, 2, 3, 5, 6, etc.), different numbers of egress ports 106 (e.g., 1, 2, 3, 5, 6, etc.), and the number of ingress ports 104 is different than the number of egress ports 106, in other embodiments. Additionally, one or more ports each serve as both an ingress port and an egress port, in some embodiments. It is noted that in light of the teachings and disclosure herein, the configuration shown is for purposes of illustration only, and that many alternative configurations are possible and within the scope the present disclosure.

The packet processor 102 also includes a forwarding engine 110 coupling together the ingress ports 104 and the egress ports 106. Generally, the forwarding engine 110 receives packets from the ingress processing unit 108, determines an egress port 106 corresponding to a destination of each packet, and forwards each packet to appropriate egress port 106. In some embodiments, the forwarding engine 110 analyzes data in a header of the packet to determine via which port or ports 106 the packet should be transmitted. For example, the forwarding engine 110 analyzes one or more of a destination address (unicast, multicast, or broadcast), a virtual local area network (VLAN) tag, etc., in the packet. The forwarding engine 110 includes a forwarding database (not shown) that stores forwarding information for different destination addresses (e.g., media access control (MAC) addresses, Internet Protocol (IP) addresses, VLANs, multicast addresses, etc.). In an embodiment, the forwarding engine 110 includes a ternary content-addressable memory (TCAM) engine (not shown).

The forwarding engine 110 processes a packet, determining, based on source and destination information, the type of packet and/or protocols associated with the packet and/or data included in the packet, for example, a port 106 of the network switch 100 via which the packet should be transmitted. The forwarding engine 110 also sets a priority of the packet, in certain embodiments, allowing the packet to be enqueued (i.e., stored in a queue), according to the priority, in a corresponding one of a plurality of queues associated with a port 106 via which the packet will be transmitted. In other embodiments, the forwarding engine 110 (e.g., TCAM policy control logic (PCL)) specifies a particular queue for a packet, instead of specifying a port and/or a priority. For example, the TCAM PCL specifies that all packets associated with a particular traffic flow be enqueued in a corresponding queue. In any event, though FIG. 1 depicts an embodiment of the forwarding engine 110, FIG. 1 is not intended to be limiting. The forwarding engine 110 is, in various embodiments, part of the ingress processing pipeline, a separate unit as depicted in FIG. 1, or a software module executed in a processing unit for processing network packets.

A queue manager 112 controls queuing operations of the network switch 100 including, in embodiments, enqueuing packets received from the forwarding engine 110. In embodiments, the queue manager 112 sets the number of queues per port, sets the priority of individual queues, and/or associates a queue with a port group (e.g., for multicast packets). The queue manager 112 is a configurable hardware element, in embodiments, operable to associate any number of queues (up to the number of queues available) with any one or more specific ports. The queue manager 112, in embodiments, is configurable at the time of device manufacture. In other embodiments, the queue manager 112 is dynamically configurable, during operation, to associate queues with ports according to present operating conditions (e.g., network conditions such as network congestion). In still other embodiments, the queue manager 112 is configurable to associate queues with ports according to a configurable port profile corresponding to each port. In any event, though FIG. 1 depicts an embodiment of the queue manager 112, FIG. 1 is not intended to be limiting. The queue manager 112 is, in various embodiments, part of an egress processing pipeline, a separate unit as depicted in FIG. 1, or a portion of code in a software driven packet processor or network processor having, for example, a dataflow pipeline architecture, or that includes a multiplicity of software driven packet programmable processing units that are configured to perform packet processing operations on a network packet.

Figure 2:
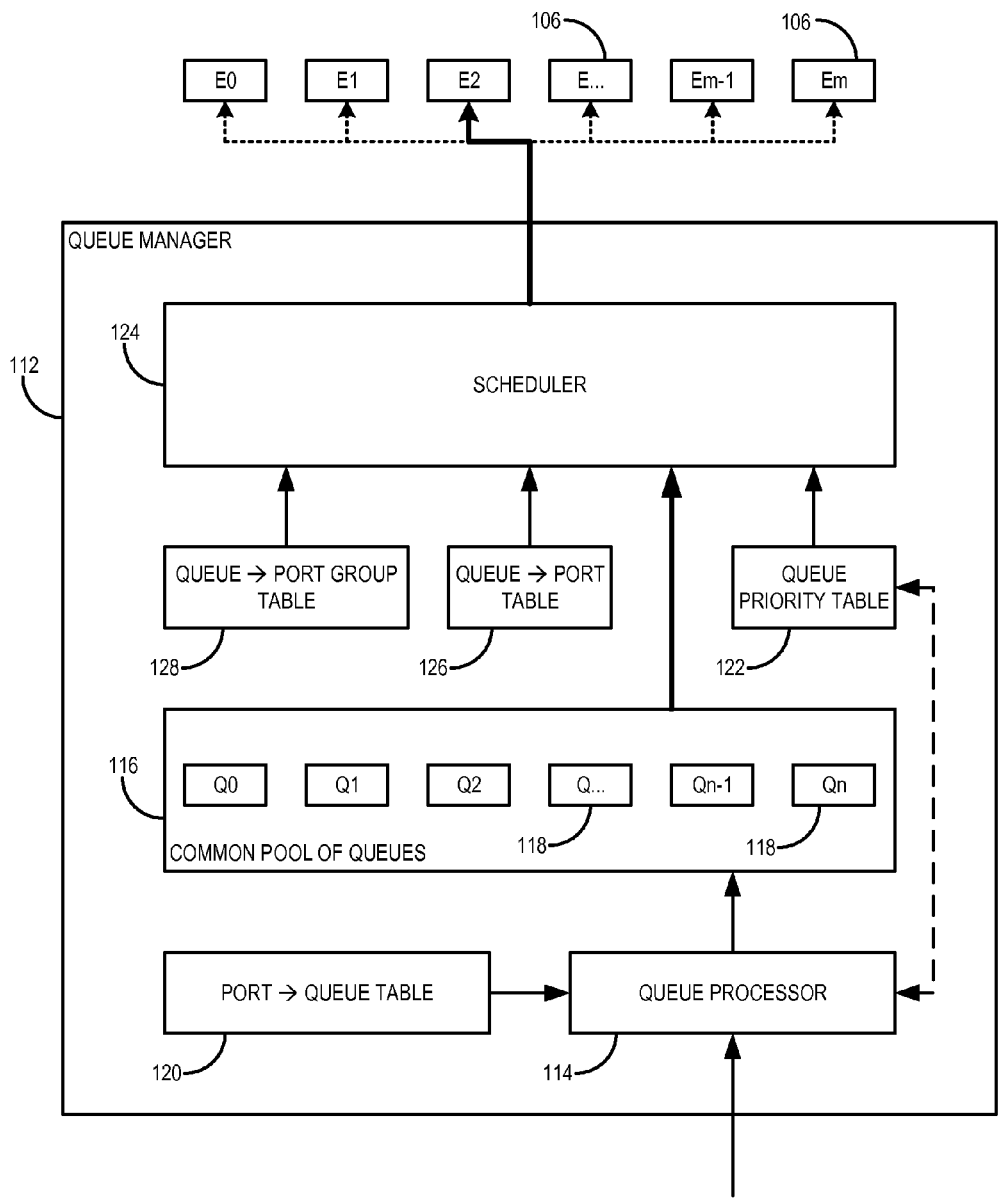
FIG. 2 is a block diagram of an embodiment of a queue manager in a network switch such as the switch depicted in FIG. 1.

FIG. 2 is a block diagram depicting an example queue manager 112 such as that depicted in FIG. 1. The queue manager 112 includes a queue processor 114 and a common pool 116 of queues 118 (also referred to herein as a "queue pool"). The queue pool 116 is a dedicated memory device, segmented into a pre-set number of queues 118, in an embodiment. Generally, the queue pool 116 includes a number N of queues 118, which is the same as, more than, or less than a number M of egress ports 106. The queue pool 116 includes queues 118 numbering eight times the number ports 106 (i.e., N=8M), in an embodiment. In any event, though the queue pool 116 includes a number N of queues 118, not all of the queues 118 are assigned (or even assignable) to ports 106, in embodiments. That is, the queues 118 in the queue pool 116 are allocated or non-allocated queues 118, and the status of any particular queue 118 as allocated or non-allocated changes during operation of the network switch 110, in embodiments.

The queue processor 114, meanwhile, enqueues packets received from the forwarding engine 110. In embodiments, the queue processor 114 enqueues packets according, at least in part, to a port associated with the destination of the packet. The queue processor 114 determines the port associated with the destination of the packet by reading a destination port field in a packet or packet descriptor, for example. After determining an egress port 106 via which the packet will eventually be transmitted from the network switch 100, the queue processor 114 enqueues the packet (i.e., places the packet into one of the queues 118 in the queue pool 116). The queue processor 114 enqueues the packet according to a port-to-queue table 120, in embodiments. The port-to-queue table 120 is a configurable table that defines exactly which queues 118 are associated with a specific port. For example, an egress port 106 has allocated to it eight (8) queues of differing priority, in an embodiment. The port-to-queue table 120 defines, in some embodiments, the subset of queues 118 allocated to or associated with a particular egress port 106.

The queue processor 114, also enqueues packets according to a priority of a packet, in embodiments. That is, for a port 106 that has associated with it (in the port-to-queue table 120) multiple queues 118 of differing priority, the queue processor 114 enqueues packets according to the priority of each packet, enqueuing each packet in a queue 118 of corresponding priority.

The queue processor 114 determines which of the queues 118 correspond to particular priorities, in some embodiments, according to a configurable queue priority table 122. The queue priority table 122 is configured prior to operation of the network switch 100 in some embodiments, and configured during operation of the network switch 100 in other embodiments. For example, in embodiments in which the queue priority table 122 is configured prior to operation of the network switch 100, each of the queues 118 associated with a particular port 106 is assigned a corresponding priority, reflected in the queue priority table 122, and the queue processor 114 enqueues packets in the queues 118 according to the port and priority associated with each packet by referring to the port-to-queue table 120 and the queue priority table 122. In embodiments, the network switch 100 is configured as a reduced-functionality device, having a fewer number of active ports (and a different price point), for example, without requiring design and/or manufacture of an additional device. In embodiments, the network switch 100 is configured with a fewer number of active ports to increase yield by allowing the sale of devices having one or more dysfunctional ports or one or more ports coupled to defective serializer-deserializer blocks. As another example, in embodiments in which the queue priority table 122 is configured during operation of the network switch 100, the queue processor 114 (or another processor) modify the queue priority table 122 when an additional queue 118 becomes associated with a particular port 106, assigning a priority to the queue 118 and modifying the queue priority table 122 accordingly. Thereafter, the queue processor 114 enqueues packets according to the port and priority associated with each packet by referring to the port-to-queue table 120 and the queue priority table 122.

In embodiments, the forwarding engine 110 specifies for some packets forwarded to the queue processor 114 a particular queue or queues 118 of the queue pool 116 into which the queue processor 114 should enqueue the packet ("direct queuing"). When processing packets for which a specific queue 118 or set of queues 118 is specified by the forwarding engine 110, the queue processor 114 enqueues packets accordingly, without performing any further analysis or processing.

A scheduler module 124, retrieves packets from the queues 118 and forwards the packets to the ports 106. The scheduler 124 services the queues 118 in strict priority, in some embodiments, and/or in a weighted round robin (WRR) priority in other embodiments. The scheduler 124 is designed or configured to support the case(s) where queues 118 associated with a particular port 106 are not sequential. For example, consider the case where eight queues 118 are assigned to each of four ports 106. That is, queues 0-7 are assigned to port 0, queues 8-15 are assigned to port 1, queues 16-23 are assigned to port 2, and queues 24-31 are assigned to port 3. The scheduler 124 is designed or configured such that if, during operation of the network switch 100, the queue processor 114 assigns an additional queue (queue 32) to port 0, the scheduler 124 will still properly function. As another example, consider the case where the network switch 100 is preconfigured with eight queues 118 assigned to each of four ports 106, but the queues 118 assigned to each port 106 are not sequential because, for instance, one or more queues 118 are defective (e.g., because the device is defective) and cannot be used. In this case, the scheduler 124 must be able to function properly even though port 0 is assigned queues 0-4 and 6-8, for example. In one embodiment, the scheduler 124 is designed using a queue link-list implementation, such that a highest priority queue 118 is linked to or points to a queue 118 with the next highest priority, and so on.

The scheduler 124 services each of the queues 118 according to the queue priority table 122 and forwards packets from the queues 118 to the ports 106 according to a queue-to-port table 126 and/or according to a queue-to-port group table 128. Simply stated, the queue-to-port table 126 is a configurable table defining which port is associated with each queue. That is, for each queue 118, the queue-to-port table 126 specifies the port 118 via which packets enqueued are to be transmitted.

The queue manager 112 is configured to process multi-cast packets, in addition to unicast and broadcast packets, in embodiments. In an embodiment in which the queue manager 112 processes multi-cast packets, the queue processor 114 identifies incoming packets marked as multi-cast and enqueues each multi-cast packet in multiple ones of the queues 118, such that the multi-cast packet is enqueued in one queue 118 for each of the ports 106 via which it is to be multicast. In other embodiments, however, the queue processor 114 enqueues multicast packets into a queue 118 not associated with one particular port 106. Queues 118 that are not associated with a particular port 106 are referred to herein as "virtual queues." Instead of being associated with a particular one of the ports 106, virtual queues are associated with a group of queues (e.g., a multicast group), in embodiments. The queue-to-port group table 128 is a configurable table defining which multicast group of ports 106 is associated with a particular virtual queue. In such embodiments, the queue processor 114 (or another processor) configures the port-to-port group table 128 to associate a group of ports 106 with a particular queue 118. The queue processor 114 (or another processor) also, in some embodiments, dynamically allocates and configures one of the queues 118 as a virtual queue.

Figure 3:
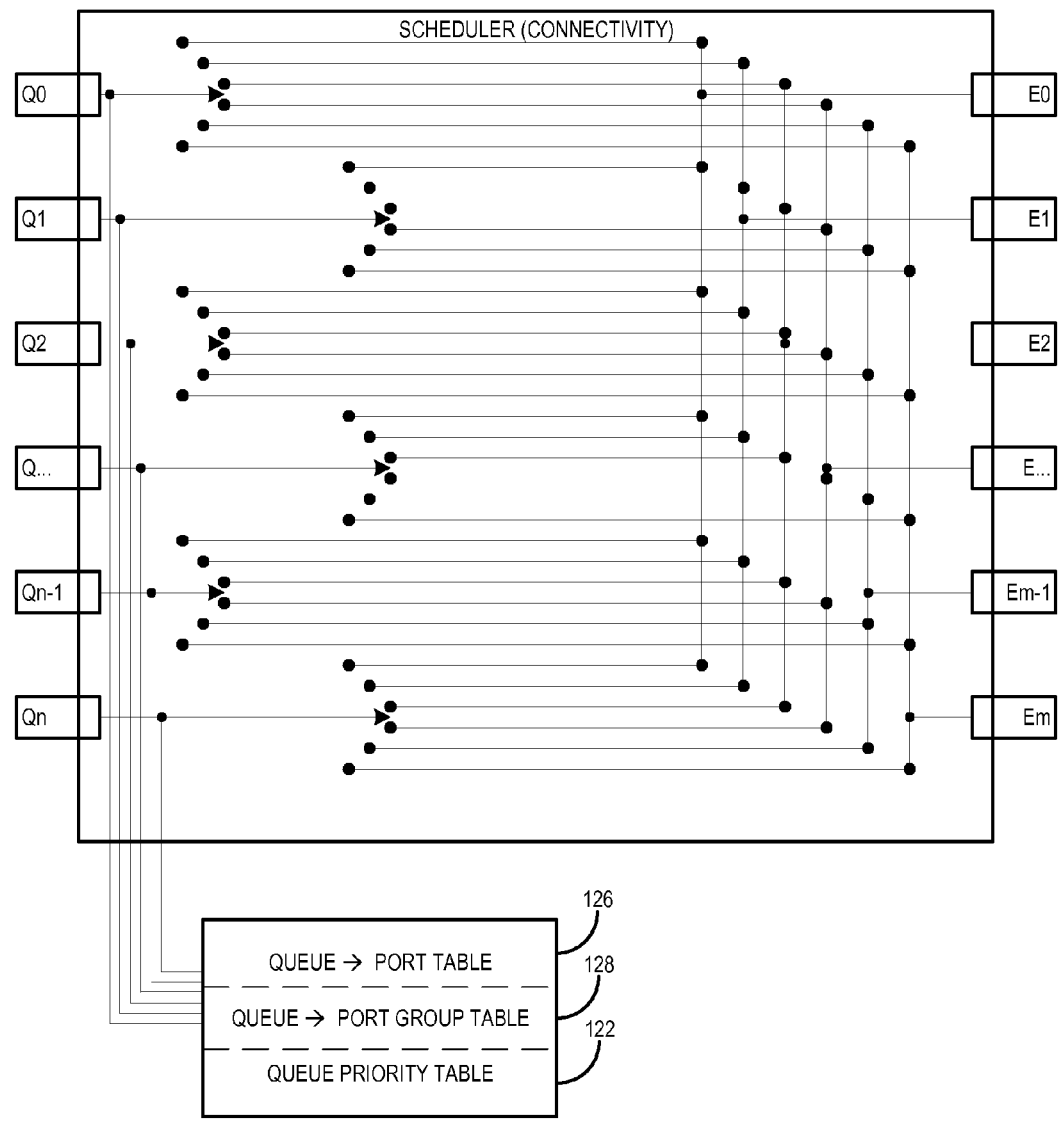
FIG. 3 is a schematic diagram illustrating aspects of the operation of a scheduler implemented in a queue manager.

In any event, the scheduler 124 directs packets from queues 118 to ports 106 according to the tables 122, 126, and/or 128. FIG. 3 is a schematic diagram illustrating the connectivity provided by the scheduler 124. FIG. 3 is not intended to represent all of the functionality of the scheduler, and is not intended as a limiting representation of the connectivity. Instead, FIG. 3 is intended merely to illustrate that the scheduler provides connectivity between any of the queues 118 and any of the ports 106, according to the tables 122, 126, and 128.

Figure 4B:
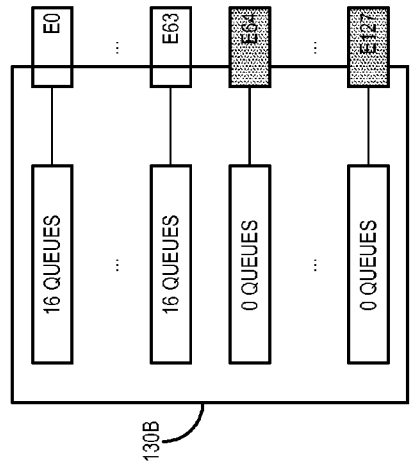
FIG. 4B illustrates a second configuration of queues and ports in a network switch configured according to the present description.
Figure 4D:
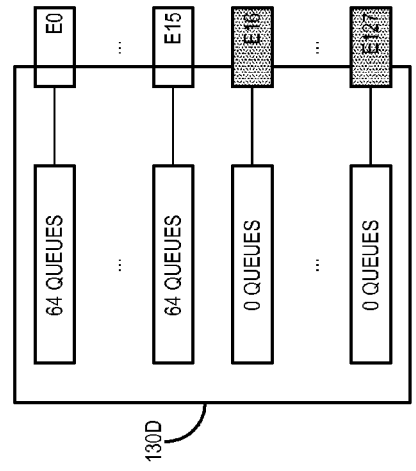
FIG. 4D illustrates a fourth configuration of queues and ports in a network switch configured according to the present description.
Figure 4A:
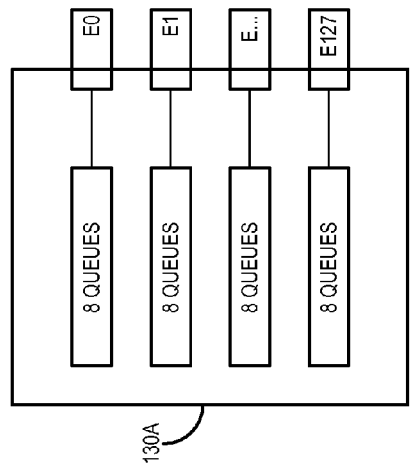
FIG. 4A illustrates a first configuration of queues and ports in a network switch configured according to the present description.
Figure 4C:
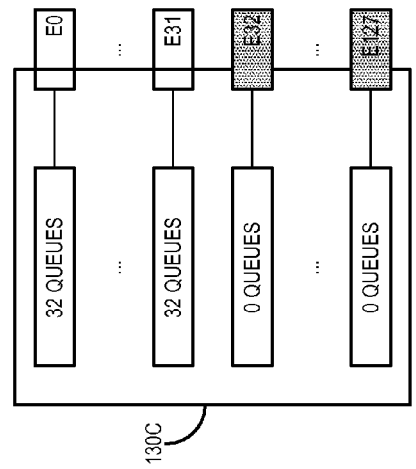
FIG. 4C illustrates a third configuration of queues and ports in a network switch configured according to the present description.

As described above, the network switch 100 and, in particular, the queue manager 112, are configured at the time of manufacture and/or sale in some embodiments, providing static configurations that facilitate the sale of devices having the same design but a different number of ports 104 and 106 that are enabled and/or different numbers of queues 118 and/or different numbers of queues 118 assigned to each port 106. FIGS. 4A-4D are partial block diagrams illustrating example static configurations of a single network switch device 130. The illustrated network switch device 130 is manufactured with 128 ports and 1,024 queues. In a first example configuration, illustrated at FIG. 4A, all 128 ports are enabled and each port is assigned eight queues. In a second example configuration, illustrated FIG. 4B, only half of the ports—64 ports—are enabled. Because all of the queues are nevertheless available, each port is assigned 16 queues in this example. FIG. 3C illustrates yet another example configuration in which only 32 ports are enabled and each port is assigned 32 queues, while FIG. 4D illustrates a configuration in which only 16 ports are enabled and each port is assigned 64 queues. Of course, it is noted that there is no requirement that each enabled port have an identical number of queues (e.g., one port could be assigned 8 queues while another port is assigned 32 queues), no requirement that the queues must all be enabled (e.g., each of 16 enabled ports could be assigned 16 queues out of a total of 1,024 queues), and no requirement that the number of ports and/or queues enabled and/or assigned be a factor of the total number of ports or queues available (e.g., 20 out of 128 ports could be enabled and 20 queues assigned to each port).

In embodiments, the queue manager 112 is configured (e.g., by a network administrator configuring the network switch 100) to assign queues 118 from the queue pool 116 dynamically according to port profiles associated with each of the ports 106. For example, a first port may be configured as associated with an "end station" port profile, a second port may be configured as associated with an "VoIP" port profile, a third port may be configured as associated with "storage" port profile, and a fourth port may be configured as associated with a "switching element" port profile. Different applications require different numbers of ports for reasons related to the number of attached devices associated with an application and/or the bandwidth of the particular application, for example. Of course, these particular examples of port profiles are intended only as non-limiting examples. It should be understood that any number of different port profiles can be configured and that multiple ports can be associated with any one of the profiles. In but one example, multiple ports of a network switch 100 are coupled to end stations and, accordingly, each port coupled to an end station is associated with the "end station" port profile. In such embodiments, each port profile defines a number of queues 118 to be assigned to ports 106 associated with the port profile. For instance, turning back to the example above, the queue manager 112 assigns 8 queues to ports associated with the "end station" port profile or to ports associated with the "storage" profile, while the queue manager assigns only a single queue to ports associated with a "VoIP" profile and assigns the maximum number of queues to ports associated with the "switching element" port profile, for example.

The queue manager 112 is additionally or alternatively configured to support multi-tenancy, in embodiments. In one such embodiment, the queue manager 112 supports multi-tenancy in that a port profile associated with a port 106 of the network switch 100 indicates that the port is associated with a plurality of tenants on a downstream device. The port profile also indicates a same number of queues per tenant (i.e., that all tenant should receive twelve queues each) in one embodiment, and indicates individually for each tenant a number of queues (i.e., four queues for a first tenant, eight queues for a second tenant, eight queues for a third tenant, etc.) in another embodiment. The queue manager 112 operates in such embodiments to associate with the port 106 queues 118 for each of the tenants. For example, where the port 106 is associated with 8 tenants, the queue manager 112 assigns eight queues (or any other number of queues, as desired and/or available) to each of the tenants, in an embodiment.

Figure 5:
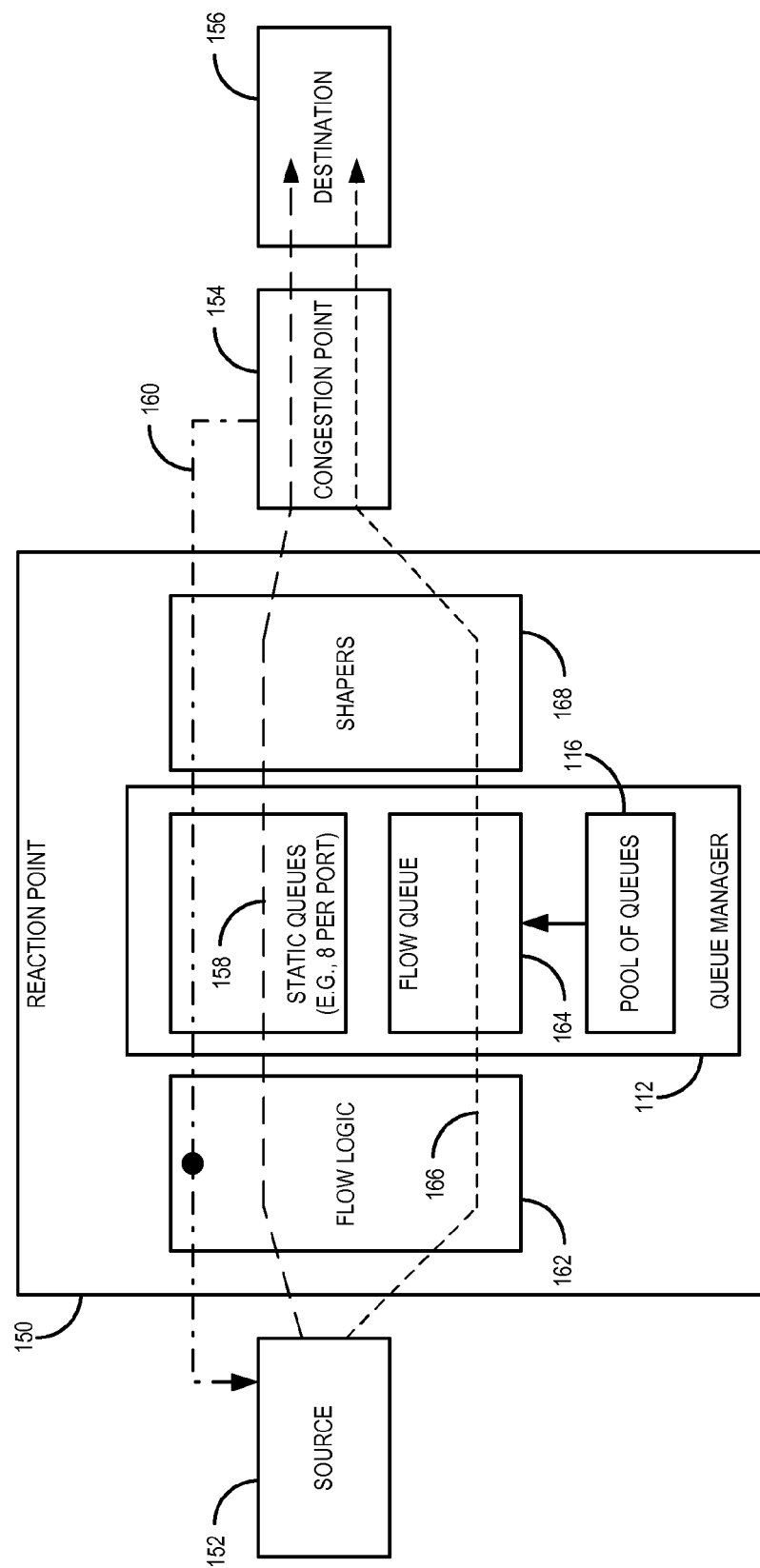
FIG. 5 is a block diagram illustrating aspects of dynamic traffic shaping implemented by the queue manager, in an embodiment.

In embodiments, the network switch 100 (FIG. 1) including the queue manager 112, is operative to function as a congestion reaction point according to the IEEE 802.1Qau protocol. FIG. 5 is a block diagram depicting a network switch 150 acting as a congestion reaction point according to IEEE 802.1Q. The network switch 150 is coupled to an upstream device 152 acting as a source of packet data and to a downstream device 154 receiving data from the network switch 150. The downstream device 154 is coupled to a destination device 156, in an embodiment. It is noted that at times the downstream device 154 may experience congestion and send a congestion notice upstream to notify the upstream (source) device 152 of congestion. If the upstream device 152 is unable to support the use of Quantized Congestion Notices (QCN) according to IEEE 802.1Qau protocol, the network switch 150 acts as a reaction point to perform traffic shaping, in embodiments.

Referring still to FIG. 5, the upstream device 152 transmits a data packet flow 158 (e.g., associated with a storage area network) to the destination device 156 (e.g., a storage device) via the network switch 150 and the downstream device 154. Upon detecting congestion, the downstream device 154 transmits a congestion notification 160 (e.g., a CNtag or a QCN notification) to the upstream device 152, in an embodiment. In an alternate embodiment, the destination device 156 detects congestion and transmits a congestion notification 160 to the upstream device. If the upstream device 152 does not support traffic shaping according to IEEE 802.1Qau, then the network switch 150, having intercepted (detected) the congestion notice 160 at flow logic 162 in the network switch 150, also detects in the flow logic 162 that the upstream device 152 did not implement traffic shaping (e.g., because the flow 158 continues at the same rate). The flow logic 162 sends a message to the queue processor 114 (see FIG. 3) to assign a queue 164 from the queue pool 116 for the traffic flow associated with the congestion notice, and traffic from the upstream device 152 is routed as a traffic flow 166 through the queue 164 and shaped by a traffic shaper 168 to limit the rate and relieve the congestion at the downstream device 154. In this way, other queues of the network switch 150 remain unaffected because the network switch 150 added an additional queue (the queue 164) for the flow from the upstream device 152 to the downstream device 154.

In another example, the flow logic 162 determines that a new data packet flow destined for the destination device 156, but having a different priority than the data packet flow 158 is being received at the network switch 150. The flow logic 162 sends a message to the queue processor 144 (FIG. 3) to assign a queue from the queue pool 116 for the data packets having the new priority, and the data packets with the new priority are routed as a traffic flow through the new queue.

Figure 6:
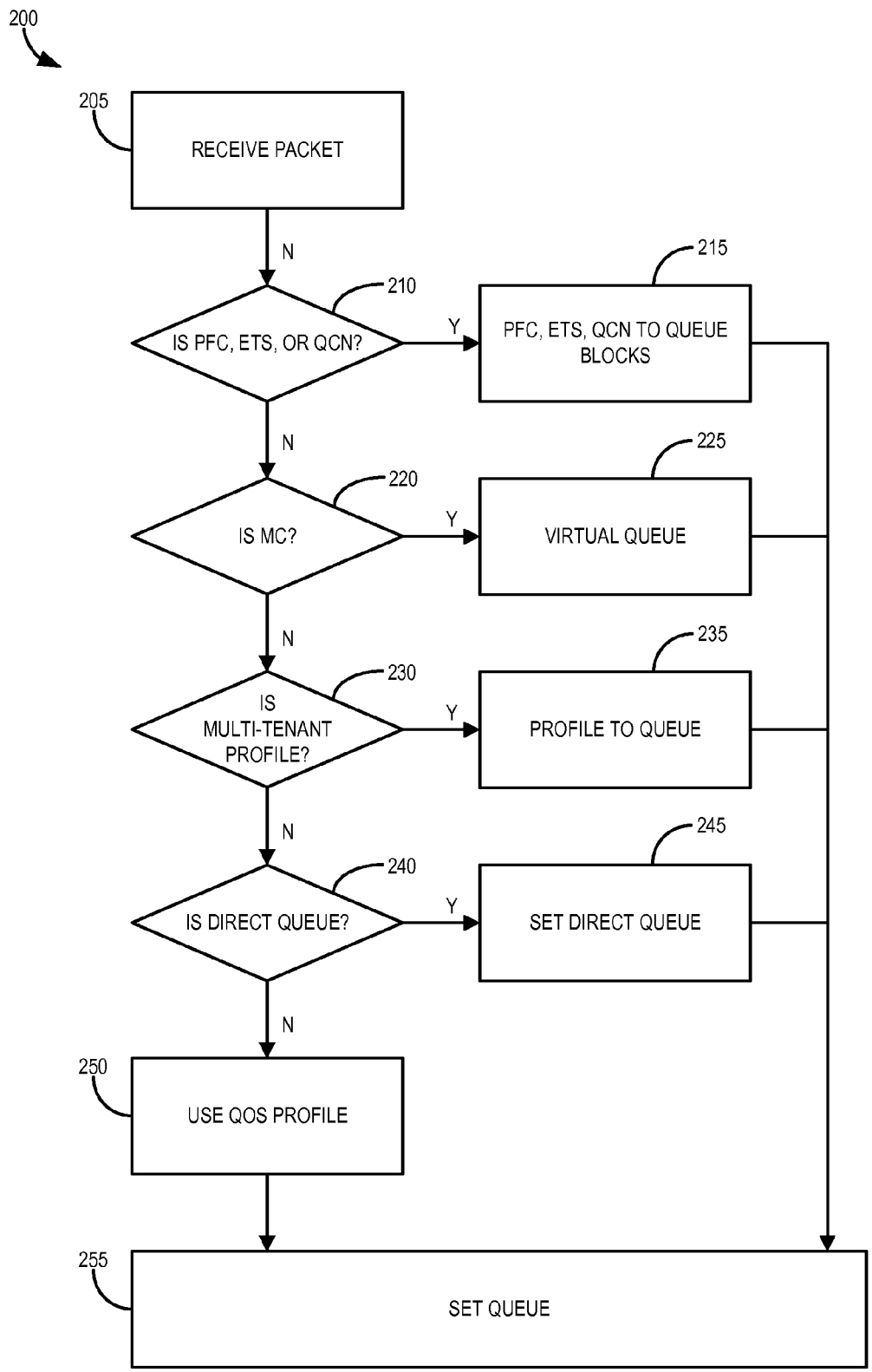
FIG. 6 is a flow diagram of an method for queuing packets in a network switch, according to an embodiment.

Turning now to FIG. 6, a flow chart depicts an example method 200 that is implemented by the queue processor 114 to enqueue packets, in embodiments. In accordance with the method 200, the queue processor 114 receives a packet from the forwarding engine 110 (block 205). The queue processor 114 determines if the packet is associated with a data flow that is operating subject to flow control and/or traffic shaping requirements (block 210). For example, in an embodiment, the queue processor 114 determines if the packet is subject to priority-based flow control (PFC) in accordance with IEEE 802.1Qbb, enhanced transmission selection (ETS) in accordance with IEEE 802.1Qaz, or quantized congestion notification (QCN) in accordance with IEEE 802.1Qau, for example. If the answer is yes, the queue processor 114 selects a queue associated with the traffic flow for the packet (block 215). If no such queue has yet been designated for the traffic flow, the queue processor 114 assigns a queue 118 from the queue pool 116, as described above. If the answer at block 210 is no, then the queue processor next determines if the packet is a multi-cast packet (block 220). If the packet is a multi-cast packet, the queue processor 114 selects a virtual queue associated with the corresponding multi-cast port group (block 225). If no virtual queue is yet associated with the multi-cast port group, the queue processor 114 assigns one of the queues 118 from the queue pool 116 as a virtual queue, as described above. If the packet is not a multi-cast packet, the queue processor 114 determines whether the packet is destined for a port associated with a multi-tenant profile (block 230). If the answer at block 230 is yes, the queue processor 114 determines the correct queue according to the multi-tenant profile (block 235). Otherwise, the queue processor 114 determines if the packet has associated with it direct queue information (i.e., if the packet includes queue information added by the forwarding engine 110) (block 240) and, if so, selects a queue 118 for the packet according to the direct queue information (block 245). If the packet is not a direct queue packet, then the queue processor 114 selects a queue 118 according to the QoS data of the packet and the port indicated by the forwarding engine 110 (block 250). After the selection of a queue (blocks 215, 225, 235, 245, or 250), the queue processor 114 enqueues the packet according to the selection (block 255).

Figure 7:
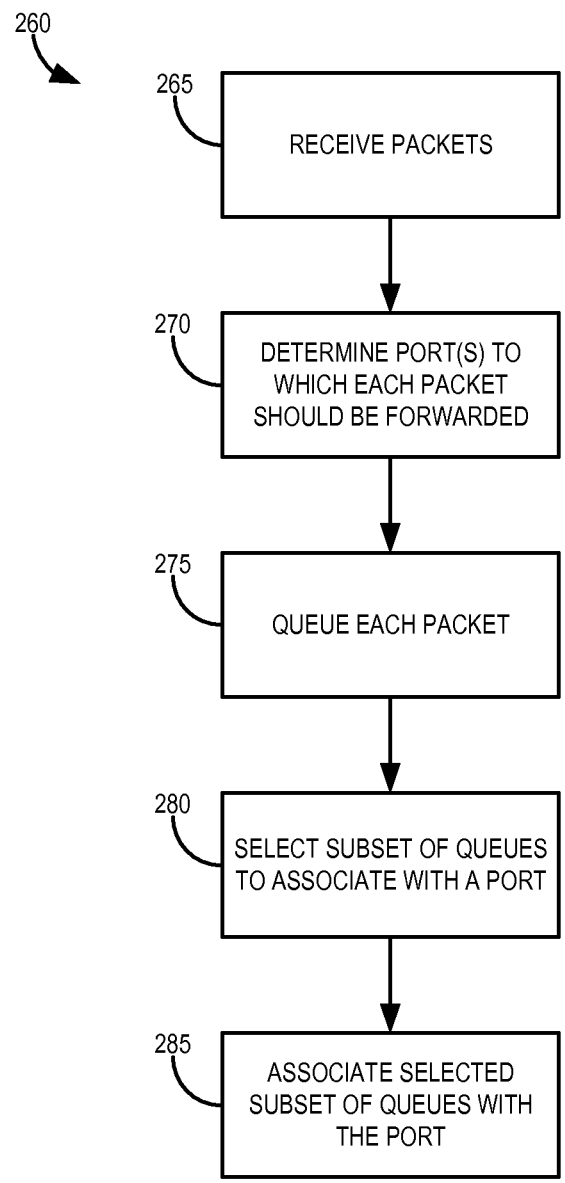
FIG. 7 is a flow diagram of an method of operating a network switch, according to an embodiment.

FIG. 7 is a flow chart depicting an example method 260 of operating a network switch such as the network switch 100. In accordance with the method 260, the network switch 100 receives packets at ports 104 of the network switch 100 (block 265). The forwarding engine 110 determines one or more ports 106 to which each of the received packets should be forwarded (block 270). The queue processor 114 receives the packets from the forwarding engine 110 and queue each packet in a queue 118 according, at least in part, to the corresponding determination of the one or more ports to which the packet should be forwarded (block 275).

The queue processor 114 selects form the pool 116 of queues 118 a subset of the queues 118 to associate with a port 116 according to a port profile associated with the port 106 (block 280). The port profile relates, in an embodiment to a specified flow or protocol (e.g., to the VoIP protocol). In another embodiment, the port profile relates to a specified traffic type (e.g., storage network traffic). In yet another embodiment, the port profile relates to a multi-tenancy configuration. In still another embodiment, the port profile relates to a specified quality of service (e.g., ports configured for certain users/entities).

Having selected the subset of available queues 118, the queue processor 114 associates the selected subset of queues 118 with the port 106 (block 285). In embodiments, associating the selected subset of queues 118 with the port 106 includes setting a value in the port-to-queue table 120 that configurably defines which queues 118 are assigned to each port 106 and/or setting a value in the queue-to-port table 126 that configurably defines which port 106 is the destination for each queue 118 and/or setting a value in a queue-to-port group table 128 that configurably defines a group of ports 106 that are the destination for each queue 118 and/or setting a value in a queue priority table 122 that configurably defines a priority associated with each queue 118.

Figure 8:
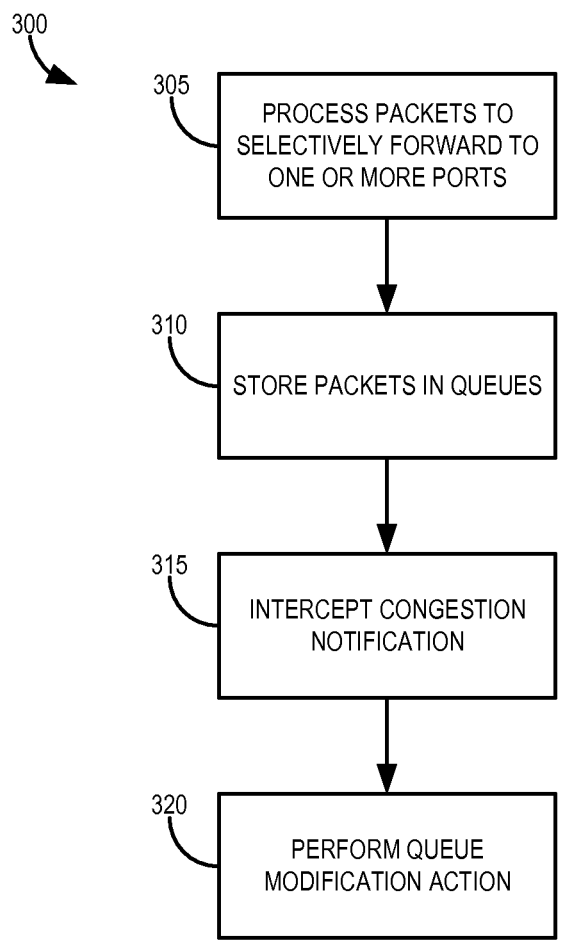
FIG. 8 is a flow diagram of a second method of operating a network switch, according to an embodiment.

FIG. 8 is a flow chart depicting an example method 300 of operating a network switch such as the network switch 100. In accordance with the method 300, the network switch 100 processes packets received from the network to selectively forward the received packets to one or more of the ports 106 for transmission (block 305). The queue processor 114 receives the processed packets from the forwarding engine 110 and stores the received packets in a plurality of queues 118 (block 310). The switch 100 intercepts the congestion notification 160 sent to the upstream device 152 disposed in or coupled to the network from the downstream device 154 (block 315). For example, the switch 100 intercepts a layer 2 congestion notification (e.g., a QCN notification) in an embodiment.

In response to the congestion notification, the queue manager 112 performs a queue modification action for mitigating congestion (block 320). In embodiments, the queue manager 112 performs a queue modification action by assigning an available (i.e., unallocated) one of the plurality of queues 118 to a port 106 associated with the downstream device 154 and performing a shaping operation on packets received from the upstream device 152 and destined for the downstream device 154. In other embodiments, the queue manager 112 performs a queue modification action by de-allocating an assigned one of the plurality of queues 118 from a port 106 associated with the downstream device 154. In still other embodiments, the queue manager 112 performs a queue modification action by modifying a queue length of a queue in response to the intercepted congestion notification. Performing a queue modification action can include setting a value in the port-to-queue table 120 that configurably defines which queues 118 are assigned to each port 106 and/or setting a value in the queue-to-port table 126 that configurably defines which port 106 is the destination for each queue 118 and/or setting a value in a queue-to-port group table 128 that configurably defines a group of ports 106 that are the destination for each queue 118 and/or setting a value in a queue priority table 122 that configurably defines a priority associated with each queue 118, in various embodiments.

While the principles of the disclosure have been described above in connection with specific apparatuses and methods, it is to be clearly understood that this description is made only by way of example and not as limitation on the scope of the invention. Additionally, at least some of the various blocks, operations, and techniques described above may be implemented in hardware, a processor or computer executing firmware and/or software instructions, or any combination thereof. The software or firmware instructions may include computer readable or machine readable instructions stored on a memory of another one or more computer readable or machine readable storage medium that, when executed by the processor, cause the processor to perform various acts. When implemented in hardware, the hardware may comprise one or more of discrete components, an integrated circuit, an application-specific integrated circuit, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device comprising:
   a plurality of ports for coupling to a network and for transmitting packets to other devices disposed in or coupled to the network;
   at least one processor configured to process packets received via the network, the processing including determining, based at least in part on destination information included in the packets, one or more ports, of the plurality of ports, via which the processed packets are to be transmitted from the network device;
   a plurality of queues defined in a memory, the plurality of queues configured to store packets to be transmitted by ports among the plurality of ports; and
   a queue manager configured to selectively assign a subset of the plurality of queues to a subset of the plurality of ports, including storing, in a memory, queue assignment information that indicates which queues are selectively assigned to which ports; and
   the network device being configured to, based on (i) the determinations of the one or more ports via which processed packets are to be transmitted from the network device and (ii) the queue assignment information, direct processed packets to one or more queues of corresponding ports to transmit the processed packets to the other devices.

2. The network device of claim 1, wherein the queue manager is configured to store, in the memory, at least one of the following data structures used by the queue manager to direct data packets to queues and/or ports of the network device:
   (i) a port-to-queue table to configurably define which queues are assigned to each port;
   (ii) a queue-to-port table to configurably define which port is associated with each queue;
   (iii) a queue-to-port-group table to configurably define which port group is associated with each queue; and
   (iv) a queue priority table to configurably define a priority associated with each queue.

3. The network device of claim 1, wherein the queue manager is configured to select the subset of ports to exclude one or more defective one of the plurality of ports.

4. The network device of claim 1, wherein the queue manager is configured to select the subset of queues to exclude at least one defective one of the plurality of queues.

5. The network device of claim 1, wherein the queue manager is configured to select the subset of ports to exclude a port coupled to a defective serializer-deserializer functional block.

6. The network device of claim 1, wherein the at least one processor comprises a packet processor that includes the queue manager.

7. A network device comprising:
   a plurality of ports configured to (i) couple the network device to a network and (ii) transmit packets to other devices disposed in or coupled to the network;
   a plurality of port profiles, each port profile corresponding to one of the plurality of ports and indicating a feature of packet traffic destined for the port or a feature of a device coupled to the port;
   at least one processor configured to process packets received from the network, the processing including determining, based at least in part on destination information included in the packets, one or more ports, of the plurality of ports, via which the processed packets are to be transmitted from the network device;
   a plurality of queues defined in a memory, the plurality of queues configured to store packets to be transmitted by ports among the plurality of ports; and
   a queue manager responsive to the port profiles and arranged to
      configurably assign to each of the plurality of ports one or more of the plurality of queues according to the port profile corresponding to the port, including storing, in a memory, queue assignment information that indicates which queues are configurably assigned, by the queue manager, to which ports, and the network device being configured to, based on (i) the determinations of the one or more ports via which processed packets are to be transmitted from the network device and (ii) the queue assignment information, direct processed packets to one or more queues of corresponding ports to transmit the processed packets to the other devices.

8. The network device of claim 7, wherein the queue manager is configured to store, in the memory, at least one of the following data structures used by the queue manager to direct data packets to queues and/or ports of the network device:
(i) a port-to-queue table to configurably define which queues are assigned to each port;
(ii) a queue-to-port table to configurably define which port is associated with each queue;
(iii) a queue-to-port-group table to configurably define which port group is associated with each queue; and
(iv) a queue priority table to configurably define a priority associated with each queue.

9. The network device of claim 7, wherein the queue manager comprises a queue processor configured to allocate queues to ports according to any one or more of the following aspects of a port profile:
(i) a specified flow or protocol;
(ii) a specified traffic type;
(iii) a specified multi-tenant configuration profile; and
(iv) a specified quality of service (QoS).

10. A network device comprising:
a plurality of ports configured to (i) couple to a network, (ii) receive packets via the network, and (iii) transmit packets via the network;
at least one processor configured to process packets received via the network, the processing including selectively forwarding received packets to one or more of the ports for transmission via the network;
a plurality of queues defined in a memory, the plurality of queues configured to store packets to be transmitted via the network; and
a queue manager configured to (i) intercept a congestion notification sent to an upstream device in or coupled to the network from a downstream device in or coupled to the network and, (ii) mitigate congestion according to the intercepted congestion notification by (a) allocating one or more additional queues to a port or (b) modifying a queue length of a queue.

11. The network device of claim 10, wherein the queue manager is configured, in response to the intercepted congestion notification, (i) to assign one of the plurality of queues to a port associated with the downstream device, and (ii) to perform a shaping operation on a flow of packets received from the upstream device and destined for the downstream device.

12. The network device of claim 10, wherein the queue manager comprises at least one of the following data structures used by the queue manager to direct data packets to queues and/or ports of the network device:
(i) a port-to-queue table to configurably define which queues are assigned to each port;
(ii) a queue-to-port table to configurably define which port is associated with each queue;
(iii) a queue-to-port-group table to configurably define which port group is associated with each queue; and
(iv) a queue priority table to configurably define a priority associated with each queue.

13. The network device of claim 10, wherein the queue manager is configured (i) to intercept a layer 2 congestion notification sent to an upstream device from a downstream device, and (ii) to perform a queue modification action for mitigating congestion according to the intercepted layer 2 congestion notification.

14. A method of configuring a network device, the method comprising:
configuring a plurality of ports to transmit network packets to other devices disposed in or coupled to a network to which the ports are or will be connected;
configuring at least one processor to process packets received via the network, the processing including determining, based at least in part on destination information included in the packets, one or more ports, of the plurality of ports, via which the processes packets are to be transmitted from the network device;
defining in a memory a plurality of queues;
configuring the plurality of queues to store packets to be transmitted;
selectively assigning, with a queue manager, a subset of the plurality of queues to a subset of the plurality of ports, including storing, in a memory, queue assignment information that indicates which queues are selectively assigned to which ports, so that the network device can, based on (i) the determinations of the one or more ports via which processed packets are to be transmitted from the network device and (ii) the queue assignment information, direct processed packets to one or more queues of corresponding ports to transmit the processed packets to the other devices.

15. The method of claim 14, further comprising selecting the subset of ports to exclude at least one defective one of the plurality of ports.

16. The method of claim 14, further comprising selecting the subset of queues to exclude at least on defective one of the plurality of queues.

17. The method of claim 14, further comprising selecting the subset of ports to exclude a port coupled to a defective serializer-deserializer functional block.

18. The method of claim 14, wherein selectively assigning the subset of the plurality of queues to the subset of the plurality of ports comprises setting values in one or more of the following data structures specifying relationships between queues and ports of the network device:
(i) a port-to-queue table configurably defining which queues are assigned to each port;
(ii) a queue-to-port table configurably defining which port is associated with each queue;
(iii) a queue-to-port-group table configurably defining which port group is associated with each queue; and
(iv) a queue priority table configurably defining a priority associated with each queue.

19. A method of operating a network device, the method comprising:
selecting, with a queue manager, from a pool of available queues a subset of queues to associate with a particular port of the network device;
assigning, with the queue manager, the selected subset of queues to the particular port, including storing, in a memory, queue assignment information that indicates that the subset of queues are assigned to the port;
receiving packets at ports of the network device;
determining, in a forwarding engine, one or more ports to which each of the received packets should be forwarded; and
queuing each packet in a queue according, at least in part, to the corresponding determination of the one or more ports to which the packet should be forwarded, including using (i) the determination of the one or more ports to which the packet should be forwarded and (ii) the queue assignment information to direct packets, determined by the forwarding engine to be forwarded to the port, to the subset of queues.

20. The method of claim 19, wherein associating the subset of queues with the particular port comprises setting a value in one or more of the following data structures specifying relationships between queues and ports of the network device:
   (i) a port-to-queue table configurably defining which queues are assigned to each port;
   (ii) a queue-to-port table configurably defining which port is associated with each queue;
   (iii) a queue-to-port-group table configurably defining which port group is associated with each queue; and
   (iv) a queue priority table configurably defining a priority associated with each queue.

21. The method of claim 19, wherein selecting from a pool of available queues a subset of queues to associate with a port comprises making a decision according to any one or more of the following aspects:
   (i) a specified flow or protocol;
   (ii) a specified traffic type;
   (iii) a specified multi-tenant configuration profile; and
   (iv) a specified quality of service (QoS).

22. A method of operating a network device having a plurality of ports coupled to a network, the method comprising:
   processing packets received from the network to selectively forward the received packets to one or more of the ports for transmission;
   storing the received packets in a plurality of queues, the queues defined in a memory and configured to store packets to be transmitted via the network;
   intercepting a congestion notification sent to an upstream device disposed in or coupled to the network from a downstream device disposed in or coupled to the network; and
   performing in a queue manager, according to the intercepted congestion notification, a queue modification action including (a) allocating one or more additional queues to a port or (b) modifying a queue length of a queue.

23. The method of claim 22, wherein performing a queue modification action comprises (i) assigning one of the plurality of queues to a port associated with the downstream device and (ii) performing a shaping operation on a packet flow received from the upstream device and destined for the downstream device.

24. The method of claim 22, wherein performing a queue modification action comprises setting a value in any one or more of the following data structures specifying relationships between queues and ports of the network device:
   (i) a port-to-queue table configurably defining which queues are assigned to each port;
   (ii) a queue-to-port table configurably defining which port is associated with for each queue;
   (iii) a queue-to-port-group table configurably defining which port group is associated with each queue; and
   (iv) a queue priority table configurably defining a priority associated with each queue.

25. The method of claim 22, wherein intercepting a congestion notification comprises intercepting a layer 2 congestion notification sent to the upstream device from the downstream device.

\* \* \* \* \*